(12) United States Patent
Ito et al.

(10) Patent No.: US 8,943,166 B2
(45) Date of Patent: Jan. 27, 2015

(54) DATA TRANSFER DEVICE, DATA TRANSFER METHOD, AND DATA TRANSFER SYSTEM

(75) Inventors: Takahiro Ito, Chiyoda-ku (JP); Shiro Suzuki, Chiyoda-ku (JP); Yoshiaki Ito, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 13/389,275

(22) PCT Filed: Aug. 12, 2009

(86) PCT No.: PCT/JP2009/064276
§ 371 (c)(1),
(2), (4) Date: Feb. 7, 2012

(87) PCT Pub. No.: WO2011/018850
PCT Pub. Date: Feb. 17, 2011

(65) Prior Publication Data
US 2012/0136967 A1      May 31, 2012

(51) Int. Cl.
*G06F 15/16* (2006.01)
*H04L 12/801* (2013.01)
*H04W 72/12* (2009.01)

(52) U.S. Cl.
CPC ........... *H04L 47/10* (2013.01); *H04W 72/1221* (2013.01)
USPC ....................................................... 709/217

(58) Field of Classification Search
CPC ....................................................... G06F 15/16
USPC .......................... 709/228, 200, 201, 203, 217
See application file for complete search history.

(56) References Cited

U.S. PATENT DOCUMENTS 5,920,701 A * 7/1999 Miller et al. .................. 709/228
6,182,111 B1 * 1/2001 Inohara et al. ................ 709/201
(Continued)

FOREIGN PATENT DOCUMENTS

CN       1818708 A      8/2006
CN     101039310 A      9/2007
(Continued)

OTHER PUBLICATIONS

Feb. 8, 2014 Chinese Office Action issued in Chinese Application No. 200980160863.2.
(Continued)

*Primary Examiner* — Vivek Srivastava
*Assistant Examiner* — Gary V Dennis
(74) *Attorney, Agent, or Firm* — Buchanan Ingersoll & Rooney PC (57) ABSTRACT

A data acquirer acquires data from another device and stores the data in a buffer. A communicator transmits the data stored in the buffer to a data collection server. A line state acquirer acquires information on a line (line state data) and accumulates and stores the acquired line state data in a line state storer. A transmission data amount determiner determines a data amount transmittable by one connection to the data collection server based on the line state data stored in the line state storer. A transmission schedule generator generates a transmission schedule for data based on a total amount of data stored in the buffer and the data amount transmittable by one connection. The communicator transmits data according to the transmission schedule.

13 Claims, 7 Drawing Sheets

(56) References Cited

U.S. PATENT DOCUMENTS

| | | | |
|---|---|---|---|
| 6,684,339 B1 * | 1/2004 | Willig | 713/300 |
| 6,829,662 B2 * | 12/2004 | King-Smith et al. | 710/56 |
| 6,973,622 B1 * | 12/2005 | Rappaport et al. | 715/735 |
| 7,489,902 B2 * | 2/2009 | Amani et al. | 455/63.1 |
| 8,275,824 B2 * | 9/2012 | Jung et al. | 709/200 |
| 2007/0033018 A1 * | 2/2007 | Gardner et al. | 704/221 |

FOREIGN PATENT DOCUMENTS

| | | |
|---|---|---|
| CN | 101494531 A | 7/2009 |
| EP | 1 718 005 A1 | 11/2006 |
| EP | 1 885 150 A2 | 2/2008 |
| JP | 7-66764 A | 3/1995 |
| JP | 11-122226 A | 4/1999 |
| JP | 2002-27010 A | 1/2002 |
| JP | 2005-20550 A | 1/2005 |
| JP | 2006-135514 A | 5/2006 |
| WO | WO 8503826 A1 * | 8/1985 ............ H04J 3/00 |
| WO | WO 2007/086124 A1 | 8/2007 |

OTHER PUBLICATIONS

Apr. 22, 2014 European Search Report issued in European Application No. EP09848269.8.

Aug. 6, 2013 Japanese Office Action issued in Japanese Patent Application No. 2011-526666.

International Search Report (PCT/ISA/210) issued on Sep. 8, 2009, by Japanese Patent Office as the International Searching Authority for International Application No. PCT/JP2009/064276.

Written Opinion (PCT/ISA/237) issued on Sep. 8, 2009, by Japanese Patent Office as the International Searching Authority for International Application No. PCT/JP2009/064276.

* cited by examiner

| NUMBER | START TIME | TRANSFER SUCCESS/ FAILURE | NUMBER OF BYTES PLANNED TO BE TRANSFERRED | NUMBER OF BYTES ACTUALLY TRANSFERRED | CONNECT TIME (SECONDS) | NUMBER OF PACKET RETRANSMISSIONS |
|---|---|---|---|---|---|---|
| 1 | 8:00 | SUCCESS | 204,800 | 204,800 | 207 | 14 |
| 2 | 9:00 | FAILURE | 307,200 | 285,000 | 322 | 25 |
| 3 | 9:15 | SUCCESS | 102,400 | 102,400 | 113 | 7 |
| 4 | 9:30 | SUCCESS | 102,400 | 102,400 | 115 | 8 |
| 5 | 9:45 | SUCCESS | 102,400 | 102,400 | 112 | 6 |
| 6 | 10:00 | SUCCESS | 102,400 | 102,400 | 110 | 6 |
| 7 | 10:20 | SUCCESS | 102,400 | 102,400 | 100 | 4 |
| 8 | 10:40 | SUCCESS | 102,400 | 102,400 | 105 | 5 |

FIG.3

| WEATHER | TEMPERATURE | RELATIVE HUMIDITY | VAPOR DENSITY | ATMOSPHERIC PRESSURE |
|---|---|---|---|---|
| RAIN | 30°C | 60% | 18.24g/m³ | 1003hPa |

DATA TRANSFER DEVICE, DATA TRANSFER METHOD, AND DATA TRANSFER SYSTEM

TECHNICAL FIELD

The present invention relates to a data transfer device, a data transfer method, and a data transfer system for transferring data acquired from outside to a server.

BACKGROUND ART

There have been conventionally proposed various techniques for preventing a decrease of data transfer efficiency even with a change in a line state (line quality) during data communication (see, for example, Patent Documents 1 and 2).

Patent Document 1 discloses a data transfer method of determining a length of a frame to be transmitted next based on a success or failure state of frame transmission.

Patent Document 2 discloses a technique for measuring an Ec/Io (pilot signal strength to total received signal strength) level of radio signals in wireless communication, determining whether a line state is recovering or worsening, setting the data size of one packet based on the result of determination, and holding communication.

RELATED REFERENCES

Patent Documents

Patent Document 1: Unexamined Japanese Patent Application KOKAI Publication No. H11-122226
Patent Document 2: Unexamined Japanese Patent Application KOKAI Publication No. 2005-20550

DISCLOSURE OF INVENTION

Problems to be Solved by the Invention

However, according to the technique disclosed in Patent Document 1, if a connection is disconnected halfway during communication, data transmitted before the disconnection is all lost. Due to this, it is necessary to transmit data from scratch after reestablishing a connection.

According to the technique disclosed in Patent Document 2, data to be transmitted is transferred by a plurality of sessions and the number of sessions (connections) is increased if a line state is good. This enables a large amount of data to be efficiently transferred. A session ID is assigned to each session and, two hosts communicating data with each other store and hold session IDs. The two hosts mutually transmit requests of session IDs and acknowledgments to the counterparts. Consequently, even if a communication is disconnected, the hosts can restart communication from the session identified by the session ID and do not need to transmit the data from scratch.

However, the amount of data transferred by one connection is fixed. Due to this, if the line state is bad, the connection is disconnected halfway, and retransmission is occurred, it has no choice to retransmit the data in the same data amount even in a situation in which there is a high possibility to disconnect the connection halfway again.

Therefore, it is required to propose a novel technique for preventing a decrease of data transfer efficiency resulting from the fact that the connection is disconnected halfway.

The present invention has been achieved in view of these circumstances. It is an object of the present invention to provide a data transfer device, a data transfer method, and a data transfer system capable of preventing a decrease of data transfer efficiency resulting from the fact that a connection is disconnected halfway by adjusting an amount of data transmitted by one connection and/or the like according to a line state during data transfer.

Means for Solving the Invention

The above-described objective is accomplished by a data transfer device according to the present invention, the data transfer device (10) including:

a data acquisition means (101) for acquiring data from another device and storing the data in a buffer (102);

a communication means (103) for transmitting the data stored in the buffer (102) to a server (20) connected to the data transfer device (10) via a predetermined network;

a line state acquisition means (104) for acquiring line state data relating to a state of a line;

a line state storage means (105) for accumulating and storing the line state data acquired by the line state acquisition means (104);

a transmission data amount determination means (108) for determining an amount of transmittable data as the amount of data transmittable by one connection with the server (20), based on the line state data stored in the line state storage means (105); and a transmission schedule generating means (109) for generating a transmission schedule for data transmission to the server (20) based on a total amount of data stored in the buffer (102) and the amount of transmittable data, wherein the communication means (103) transmits the data stored in the buffer (102) according to the transmission schedule.

Effects of the Invention

According to the present invention, it is possible to prevent a decrease of data transfer efficiency resulting from the fact that connection is disconnected halfway.

BEST MODE FOR CARRYING OUT THE INVENTION

A data transfer system according to embodiments of the present invention will be described hereinafter with reference to the drawings.

Figure 1:
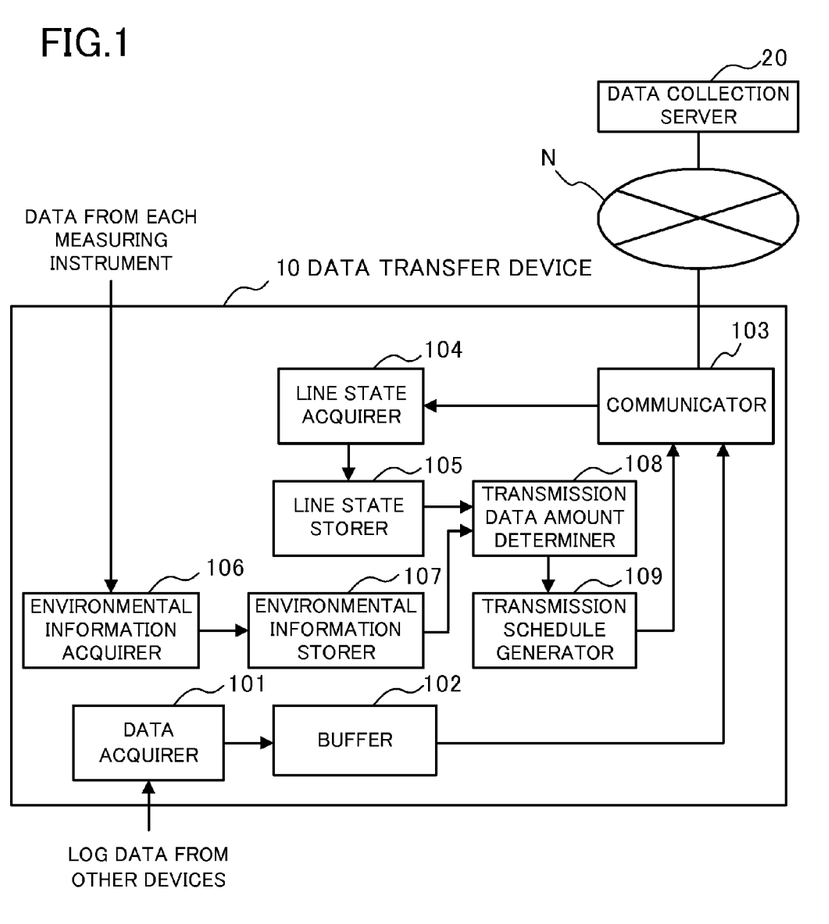
FIG. 1 is a block diagram illustrating a configuration of a data transfer system according to an embodiment of the present invention.

FIG. 1 is a block diagram illustrating a configuration of a data transfer system according to the embodiment of the present invention. As shown in FIG. 1, this data transfer system is configured to include a data transfer device 10 and a data collection server 20. The data transfer device 10 and the data collection server 20 are connected to each other so as to be mutually communicable via a wide area network N such as the Internet.

In the embodiment, the data transfer device 10 acquires various log data on solar photovoltaic power generation from one or a plurality of devices and transfers the acquired log data to the data collection server 20. The data collection server 20 includes server functions for TCP/IP (Transmission Control Protocol/Internet Protocol) communication such as that according to HTTP (HyperText Transfer Protocol), FTP (File Transfer Protocol), and SMTP (Simple Mail Transfer Protocol).

The data transfer device 10 includes a data acquirer 101, a buffer 102, a communicator 103, a line state acquirer 104, a line state storer 105, an environmental information acquirer 106, an environmental information storer 107, a transmission data amount determiner 108, and a transmission schedule generator 109. Although not shown, each of the constituent elements is connected to either a CPU or an MPU (hereinafter, "CPU and/or the like") included in the data transfer device 10. The CPU and/or the like controls each constituent element by executing a predetermined program stored in a ROM and/or the like.

The data acquirer 101 is connected to each of the devices (such as a solar battery, various sensors, and a power conditioner) for solar photovoltaic power generation by either wired or wireless connection so as to be able to communicate data, and receives the log data such as production of electricity and weather conditions transmitted from the devices at predetermined timing (specifically, at a predetermined time interval in the embodiment). The data acquirer 101 stores the received log data in the buffer 102. The buffer 102 is configured by, for example, a nonvolatile readable/writable semiconductor memory.

The communicator 103 includes a communication equipment such as a modem and communication software of PPP (Point-to-Point Protocol), TCP/IP, HTTP clients, an SMTP client and/or the like, and communicates data with the data collection server 20 via the wide area network N. At that time, the communicator 103 executes data communication based on a processing result of the transmission schedule generator 109 as described later in detail.

The line state acquirer 104 acquires information on a line state (line state information) such as an error that occurred while the communicator 103 is performing communication, a transmission data amount, and communication time. In the embodiment, the line state acquirer 104 acquires, for each connection, start time, transfer success/failure, the number of bytes planned to be transferred, the number of bytes actually transferred, connect time, and the number of packet retransmissions, and stores these pieces of data in the line state storer 105 (see FIG. 2) as the line state data.

Figure 2:
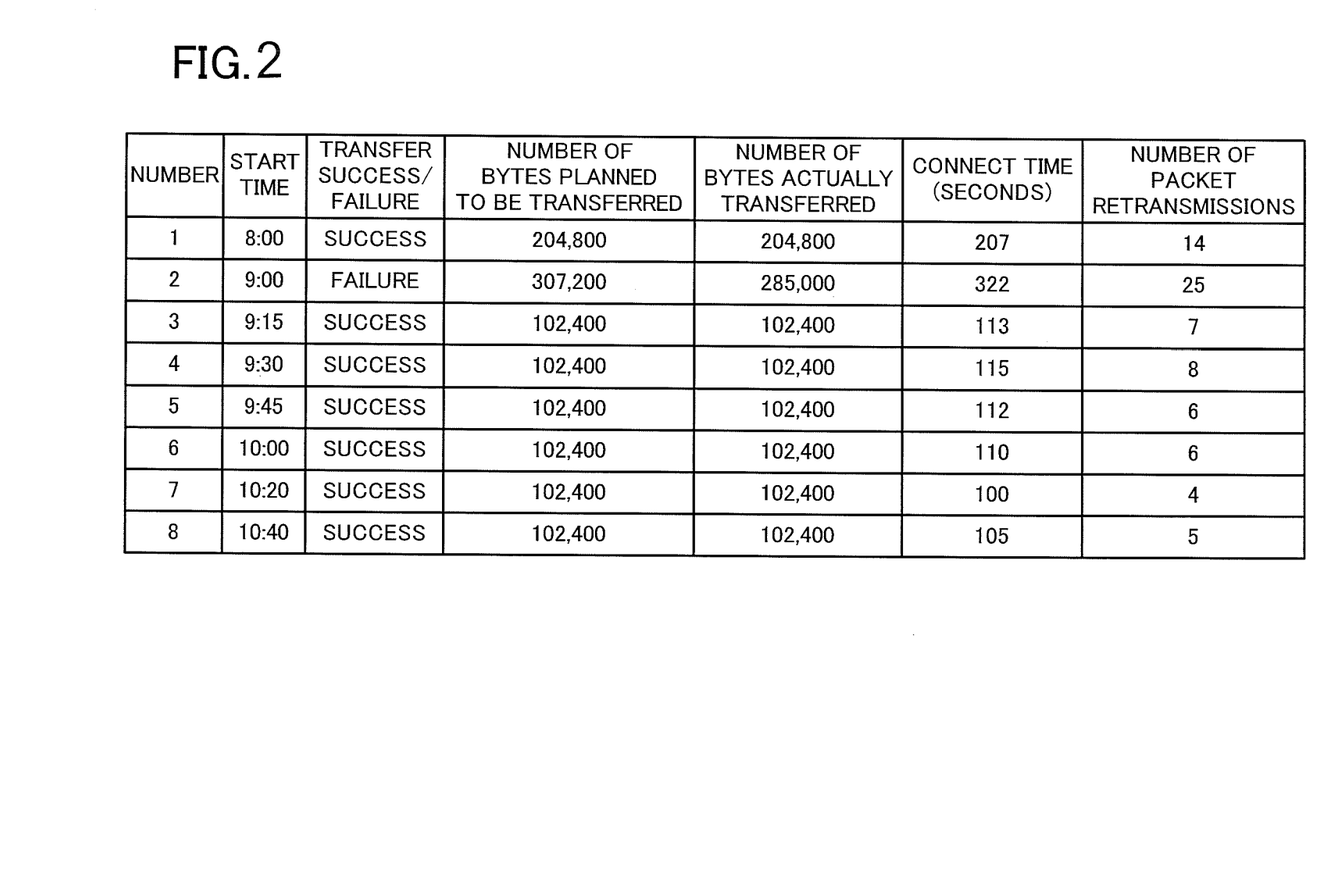
FIG. 2 illustrates an example of line state data stored in a line state storer.

The line state storer 105 is configured by, for example, a nonvolatile readable/writable semiconductor memory. As shown in FIG. 2, line state data within the last few hours is accumulated and stored in the line state storer 105.

The environmental information acquirer 106 acquires various information on current weather conditions from measuring instruments, which are not shown, as environmental information. In the embodiment, the environmental information acquirer 106 acquires the weather conditions that are normally considered to affect the line state. Specifically, the environmental information acquirer 106 acquires the weather, temperature, relative humidity, water vapor density, atmospheric pressure, and/or the like, as the environmental information. The environmental information acquirer 106 determines these weather conditions based on the data acquired from various measuring instruments (such as a visibility meter, a heliograph, a thermometer, a hygrometer, and a barometer), which are not shown, connected to the data transfer device 10. If the log data received by the data acquirer 101 includes the information on the weather conditions, the environmental information acquirer 106 may be designed to extract the information from the log data and use the extracted information. Alternatively, the environmental information acquirer 106 may be designed to download information on weather conditions from the data collection server 20.

Figure 3:
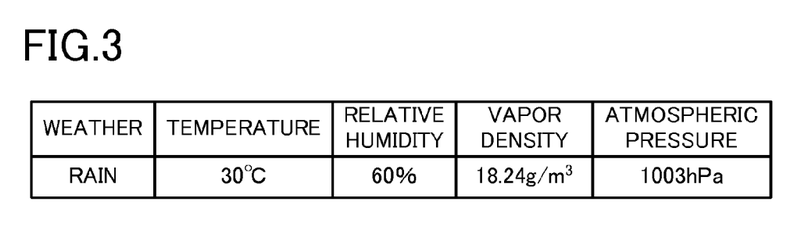
FIG. 3 illustrates an example of environmental information stored in an environmental information storer.

The environmental information acquirer 106 acquires the environmental information at predetermined time intervals and stores the environmental information in the environmental information storer 107 configured by, for example, a nonvolatile readable/writable semiconductor memory (see FIG. 3).

The transmission data amount determiner 108 calculates an amount of data (the number of bytes) transmittable without disconnecting a connection based on the line state data stored in the line state storer 105 and the environmental information stored in the environmental information storer 107. The transmission schedule generator 109 generates a transmission schedule for data transmission to the data collection server 20 based on the amount of transmittable data by one connection determined by the transmission data amount determiner 108 and a total amount of log data stored in the buffer 102.

Subsequently, processing procedures executed by the data transfer device 10 which is configured as described above will next be described with reference to the flowcharts of FIGS. 4 and 5.

When the data transfer device 10 is powered on, the CPU and/or the like is activated and the above-described constituent elements repeatedly execute the following processing under a control of the CPU and/or the like. First, the data acquirer 101 executes processing for acquiring the log data from the other devices (Step S101).

The data acquirer 101 transmits a log data transmission request message to each of all the devices (such as the solar battery, the various sensors, and the power conditioner) connected to the data transfer device 10. Each device transmits the log data held in the device to the data transfer device 10 in response to this transmission request message. The data acquirer 101 receives the log data transmitted from each device and stores the log data in the buffer 102.

The environmental information acquirer 106 executes processing for acquiring the environmental information synchronously with the processing performed by the data acquirer 101 (Step S102). The environmental information acquirer 106 acquires data (measured values) from the measurement instruments (such as the visibility meter, the heliograph, the thermometer, the hygrometer, and the barometer), which are not shown, and obtains current weather conditions. Specifically, the environmental information acquirer 106 obtains data on the weather, the temperature, the relative humidity, the water vapor density, and the atmospheric pressure based on these acquired data. The environmental information acquirer 106 stores the obtained weather conditions in the environmental information storer 107 as the environmental information. The environmental information acquirer 106 may execute the processing for acquiring the environmental information asynchronously. Specifically, the environmental information acquirer 106 may execute the processing at different time intervals from the processing executed by the data acquirer 101.

In subsequent Step S103, data transmission processing is executed. This data transmission processing will be described in detail with reference to the flowchart of FIG. 5.

First, the transmission data amount determiner 108 calculates the amount of data (the number of bytes) transmitted by one connection based on the line state data stored in the line state storer 105 and the environmental information stored in the environmental information storer 107 (Step S201). Specific examples of this calculation method will be enumerated as follows.

Figure 6:
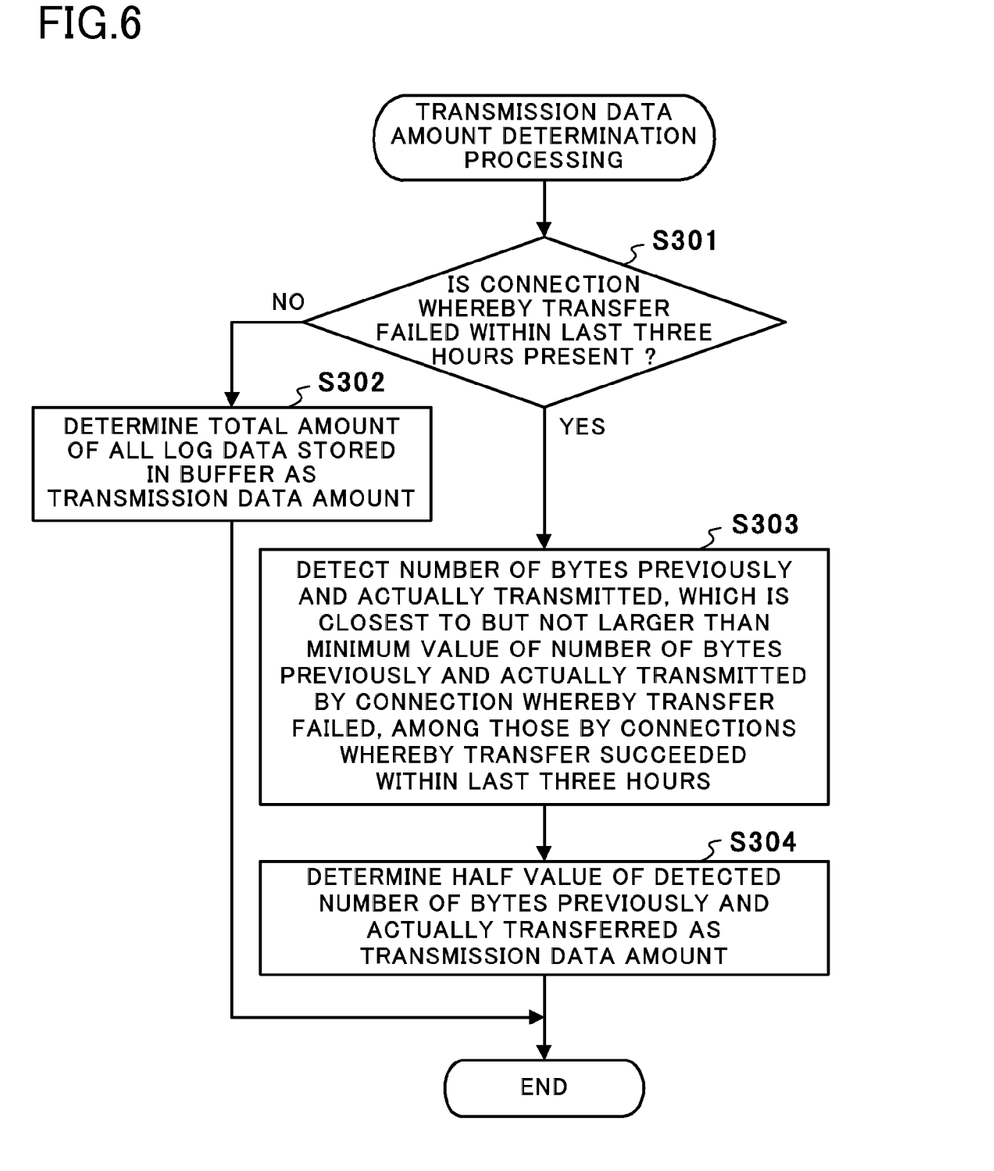
FIG. 6 is a flowchart illustrating a procedure (1) for transmission data amount determination processing.

(1) Calculation Method Based on Transfer Success/Failure and the Number of Bytes Actually Transferred.

An example of this case will be described with reference to the flowchart of FIG. 6. First, the transmission data amount determiner 108 checks whether a connection in which data transfer failed within the last three hours is present with reference to the line state data (Step S301). As a result, if the connection in which transfer failed within the last three hours is not present (Step S301, NO), the transmission data amount determiner 108 determines the total amount of all log data stored in the buffer 102 as the amount of data transmitted by one connection (Step S302).

If a certain connection in which transfer failed within the last three hours is present (Step S301, YES), the transmission data amount determiner 108 detects the number of bytes actually transferred, which is closest to but not larger than a minimum value of the number of bytes actually transferred by the connection in which transfer failed, among those by connections by which transfer succeeded within the last three hours (Step S303). In other words, the transmission data amount determiner 108 detects the largest number of bytes actually transferred, and a transfer did not fail in amounts equal to or smaller than the value, among those by the connections in which transfer succeeded within the last three hours. The transmission data amount determiner 108 determines half the value of the detected number of bytes actually transferred as the amount of data transmitted by one connection (Step S304).

If the line state data within the last three hours is that shown in FIG. 2, half the value of the number of bytes actually transferred in a connection indicated by Number 1, for example, 102,400 bytes is determined as the amount of data transmitted by one connection.

Figure 7:
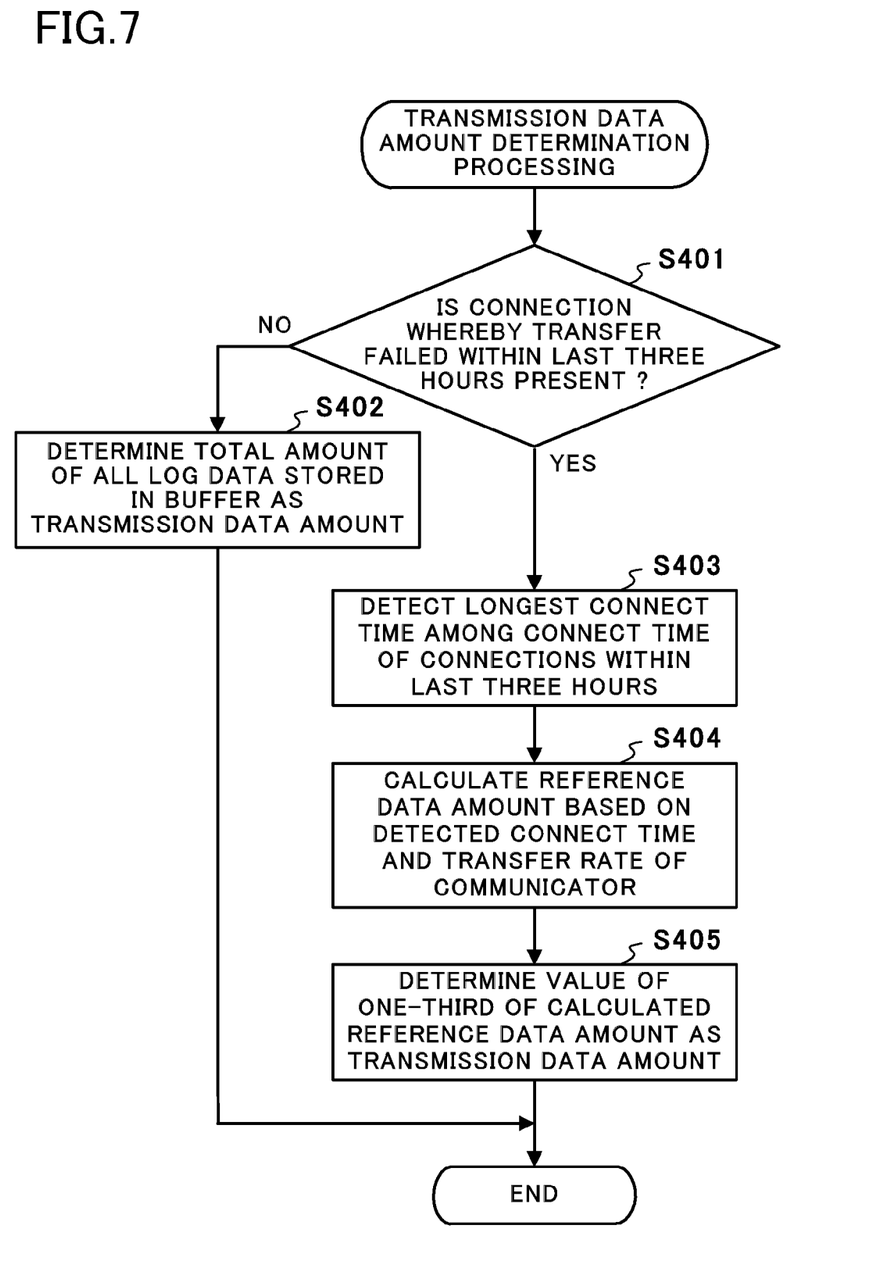
FIG. 7 is a flowchart illustrating a procedure (2) for the transmission data amount determination processing.

(2) Calculation Method Based on Transfer Success/Failure and Connect Time

An example of this case will be described with reference to the flowchart of FIG. 7. First, the transmission data amount determiner 108 checks whether a connection in which transfer failed within the last three hours is present with reference to the line state data (Step S401). As a result, if the connection in which transfer failed within the last three hours is not present (Step S401, NO), the transmission data amount determiner 108 determines the total amount of all log data stored in the buffer 102 as the amount of data transmitted by one connection (Step S402).

If a certain connection in which transfer failed within the last three hours is present (Step S401, YES), the transmission data amount determiner 108 detects longest connect time among connect time of connections within the last three hours (Step S403). The transmission data amount determiner 108 calculates a reference data amount based on the detected connect time and a transfer rate of the communicator 103 (Step S404). The transmission data amount determiner 108 determines the value of one-third of the calculated reference data amount as the amount of data transmitted by one connection (Step S405).

Figure 8:
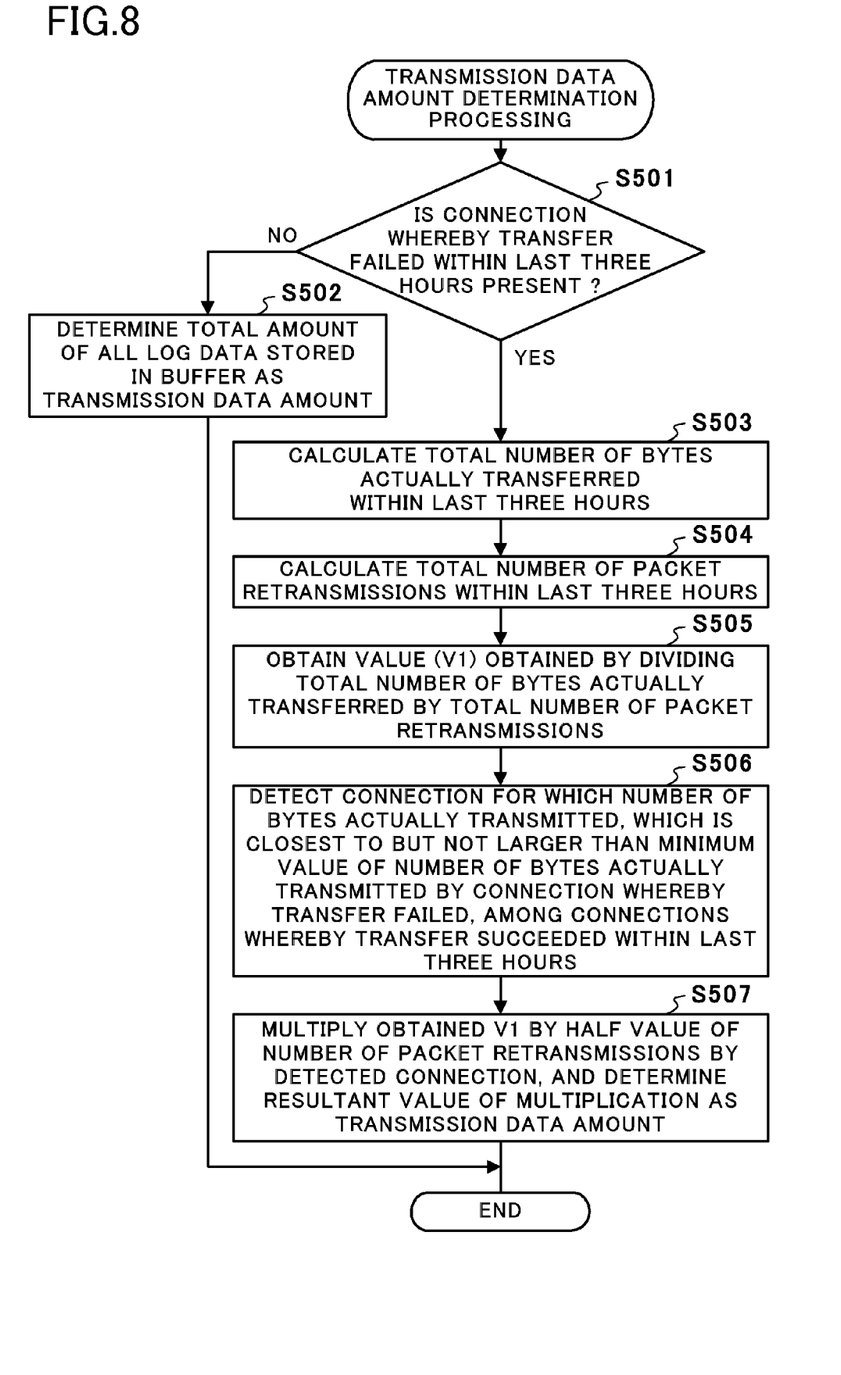
FIG. 8 is a flowchart illustrating a procedure (3) for the transmission data amount determination processing.

(3) Calculation Method Based on Transfer Success/Failure, the Number of Bytes Actually Transferred, and the Number of Packet Retransmissions An example of this case will be described with reference to the flowchart of FIG. 8. First, the transmission data amount determiner 108 checks whether a connection in which transfer failed within the last three hours is present with reference to the line state data (Step S501). As a result, if the connection in which transfer failed within the last three hours is not present (Step S501, NO), the transmission data amount determiner 108 determines the total amount of all log data stored in the buffer 102 as the amount of data transmitted by one connection (Step S502).

If a certain connection in which transfer failed within the last three hours is present (Step S501, YES), the transmission data amount determiner 108 calculates a total number of bytes actually transferred by connections within the last three hours (Step S503) and calculates a total number of packet retransmissions by the connections within the last three hours (Step S504). The transmission data amount determiner 108 divides the total number of bytes actually transferred by the total number of packet retransmissions and obtains a resultant value (V1) of the division (Step S505).

Next, the transmission data amount determiner 108 detects a connection corresponding to the number of bytes actually transferred, which is closest to but not larger than a minimum value of the number of bytes actually transferred by the connection in which transfer failed, among connections in which transfer succeeded within the last three hours (Step S506).

The transmission data amount determiner 108 multiples the V1 obtained in Step S505 by half the value of the number of packet retransmissions in the connection detected in the step S506, and determines a resultant value of the multiplication as the amount of data transmitted by one connection (step S507).

For example, if the line state data within the last three hours is that shown in FIG. 2, the total number of bytes actually transferred in Step S503 and the total number of packet retransmissions in Step S504 are 1,104,200 bytes and 75, respectively. As a result, V1=14,722 bytes (the digits after the decimal point have been omitted). Furthermore, in Step S506, the transmission data amount determiner 108 detects the connection indicated by Number 1 in FIG. 2. In Step S507, the transmission data amount determiner 108 determines V1× (14/2)=103,054 bytes as the data amount.

(4) Calculation Method Based on Environmental Information

The transmission data amount determiner 108 calculates an attenuation factor of a radio wave with reference to the environmental information stored in the environmental information storer 107 based on information disclosed by a well-known document such as Chapters 5 and 6 in *Radioactive Propagation Handbook*, Realize Science & Engineering Center Co., Ltd., Tokyo, 1999. The transmission data amount determiner 108 determines the amount of data transmitted by one connection from the calculated attenuation factor using a predetermined calculation formula or a table prepared in advance for deriving the transmission data amount from the attenuation factor of the radio wave.

The transmission data amount determiner 108 may determine the amount of data transmitted by one connection with reference to only one of the line state data and the environmental information as described in the calculation examples or, may change reference data/information according to various conditions. For example, if the line state data is not stored in the line state storer 105 at a time of activating the data transfer device 10, the transmission data amount determiner 108 may calculate the data amount with reference to the environmental information stored in the environmental information storer 107.

Alternatively, the transmission data amount determiner 108 may adopt the smaller one of the data amount calculated with reference to the line state data (for example, the data amount calculated by one of the methods (1) to (3) described above) and the data amount calculated with reference to the environmental information (for example, the data amount calculated by the method (4) above) as the amount of data transmitted by one connection.

Figure 5:
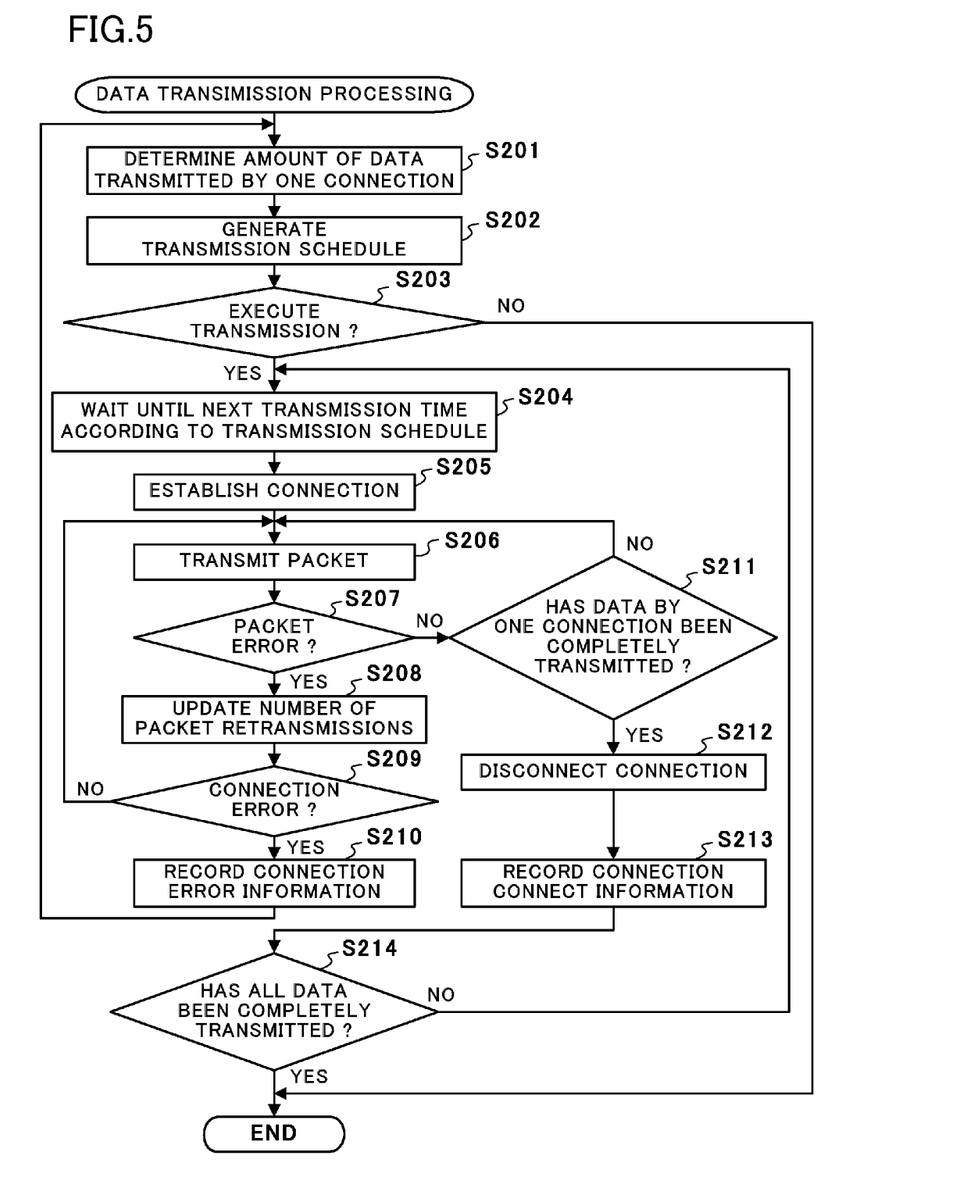
FIG. 5 is a flowchart illustrating procedures for data transmission processing.

Referring back to the flowchart of FIG. 5, the transmission schedule generator 109 generates a transmission schedule for data in Step S202 (Step S202). The transmission schedule generator 109 generates the transmission schedule based on the total amount of log data stored in the buffer 102 (specifically, the amount of data to be transmitted) and the amount of data transmitted by one connection as determined by the transmission data amount determiner 108 (specifically, the amount of transmittable data). In the embodiment, the transmission schedule generator 109 generates the transmission schedule further based on allowed transmission time. The allowed transmission time is time from present time to next data acquisition time. The next data acquisition time is time at which the data acquirer 101 acquires log data next. Note that the allowed transmission time may be fixed in advance.

For example, if the amount of data to be transmitted is 307,200 bytes, the amount of transmittable data is 102,400 bytes, and the time before the next data acquisition time (specifically, allowed transmission time) is one hour, the transmission schedule generator 109 divides the amount of data to be transmitted (307,200 bytes) by the amount of transmittable data (102,400 bytes) and obtains a resultant value of the division (three in this example). The transmission schedule generator 109 generates a transmission schedule for data transmission to the data collection server 20 at intervals of time (20 minutes) obtained by dividing the allowed transmission time (one hour) by three. In an example in which the transmission schedule is generated without based on the allowed transmission time, the transmission schedule generator 109 sets preset time (for example, 20 minutes) as a transmission interval.

Numbers 6 to 8 of FIG. 2 show an example of the line state data during data transmission according to the transmission schedule described in the above example. Numbers 2 to 5 of FIG. 2 show an example of transmitting data three times separately after a transmission failure (Number 2). The transmission interval in the transmission schedule right after such a failure is obtained based on the number of times (for example, four) obtained by adding one (the number of actual transmission failures) to the number of divisions (for example, three) and on the time (for example, one hour) before the next data acquisition time. As a result, the transmission interval is set to 15 minutes in the example of Numbers 2 to 5 of FIG. 2.

If the data amount determined by the transmission data amount determiner 108 is small and it is necessary to divide data into ten or more packets so as to transmit all the log data stored in the buffer 102, the transmission schedule generator 109 generates a transmission schedule as interruption of data transmission.

If the amount of transmittable data matches the amount that should be transmitted such as when the line state is good, (specifically, when all the log data can be transmitted in data transmission by one connection) the transmission schedule generated by the transmission schedule generator 109 naturally does not include the above-described transmission interval.

The CPU and/or the like determines whether to execute transmission with reference to the transmission schedule generated by the transmission schedule generator 109 (Step S203). If contents of the transmission schedule indicate the interruption of data transmission as described above, the CPU and/or the like determines to interrupt transmission (Step S203, NO) and finishes the processing (data transmission processing).

On the other hand, if the CPU and/or the like determines to execute transmission (Step S203, YES), the communicator 103 executes data communication according to the transmission schedule generated by the transmission schedule generator 109. After waiting until the transmission time shown in the transmission schedule (Step S204), the communicator 103 establishes a connection to the data collection server 20 for data communication (Step S205).

After the connection is established, the line state acquirer 104 additionally creates a record of new line state data in the line state storer 105, and stores current time in "start time", the data amount determined by the transmission data amount determiner 108 in "number of bytes planned to be transferred".

The communicator 103 divides the transmission data into packets of a predetermined size and transmits the divided packets (Step S206). If not receiving an acknowledgement of the transmitted packet from the data collection server 20, the communicator 103 determines that a packet error occurred (Step S207, YES). In this case, the line state acquirer 104 increments and updates "number of packet retransmissions" in the line state data on the connection stored in the line state storer 105 (Step S208).

Next, the communicator 103 determines whether or not a connection error occurred (Step S209). Specifically, if a timeout occurs or the data collection server 20 transmits reset packets, the communicator 103 determines that the connection error occurred, that is, the connection is disconnected (Step S209, YES). In this case, the line state acquirer 104 records connection error information (Step S210). Specifically, the line state acquirer 104 stores failure in "transfer success/failure", the number of bytes transferred so far in "number of bytes actually transferred", and time required from establishment of the connection to the disconnection thereof in "connect time" in the line state data on the connection stored in the line state storer 105.

After the line state acquirer 104 records the connection error information, the processing returns to Step S201, and the transmission data amount determiner 108 re-executes processing.

If no connection error occurred (Step S209, NO), the processing returns to Step S206, and the communicator 103 re-transmits the packets for which the error occurred.

If it is determined that no packet error occurred in Step S207 (Step S207, NO), the communicator 103 determines whether or not all the data planned to the connection has been completely transmitted (Step S211). If all the data planned to this connection has been completely transmitted (Step S211, YES), the communicator 103 disconnects the connection (Step S212). Furthermore, the line state acquirer 104 records connection connect information (Step S213). Specifically, the line state acquirer 104 stores success in "transfer success/failure", the number of bytes transferred so far (identical to the value of "number of bytes planned to be transferred" in this case) in "number of bytes actually transferred", and the time required from establishment of the connection to the disconnection thereof in "connect time" in the line state data on the connection stored in the line state storer 105.

If all the data planned to be transferred in this connection has not been completely transmitted (Step S211, NO), the processing returns to Step S206, and the communicator 103 transmits a next packet.

After the processing of Step S213, the communicator 103 determines whether or not all the data (all the log data stored in the buffer 102) has been completely transmitted (Step S214). As a result, if all the data has been completely transmitted (Step S214, YES), the CPU and/or the like finishes the processing (data transmission processing).

On the other hand, if all the data has not been completely transmitted (Step S214, NO), the processing returns to Step S204, and the communicator 103 waits until the next transmission time shown in the transmission schedule.

Figure 4:
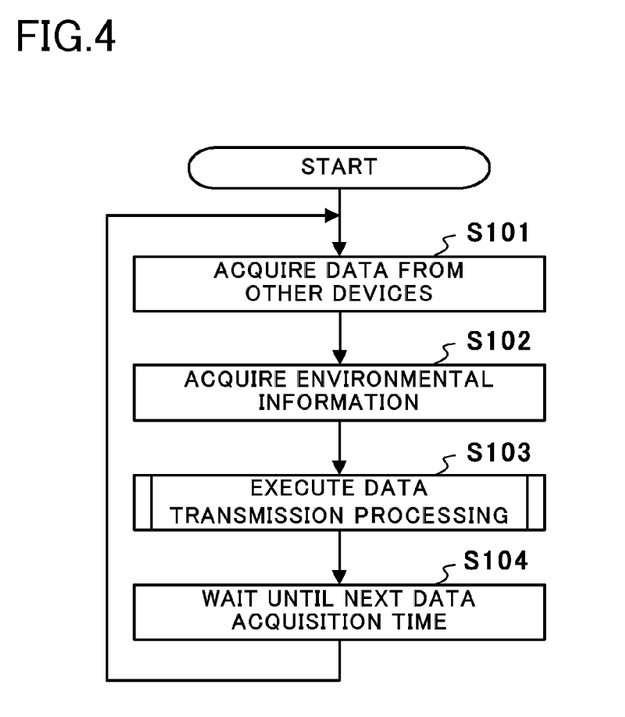
FIG. 4 is a flowchart illustrating processing procedures executed by a data transfer device.

After the above-described data transmission processing ends, the CPU and/or the like controls the respective constituent elements to wait and temporarily halt the processing until the next data acquisition time at which the data acquirer 101 acquires next data (Step S104 of FIG. 4). Thereafter, the CPU and/or the like activates the data acquirer 101 and the processing starting at Step S101 is then repeatedly executed.

As described so far, in the data transfer system according to the embodiment, when the data transfer device 10 transmits the data (log data) acquired by the data acquirer 101 to the data collection server 20, the transmission data amount determiner 108 determines the amount of transmittable data by one connection based on the line state data stored in the line state storer 105. The transmission schedule generator 109 generates the transmission schedule for data based on the total amount of data stored in the buffer 102 and the amount of transmittable data by one connection. The communicator 103 executes transmission of data according to this transmission schedule.

Accordingly, if the line state is bad, it is possible to prevent the data transfer device 10 from transmitting a large amount of data at a time. Even if a connection is disconnected halfway, it is possible to prevent re-transmission of a large amount of data.

Furthermore, the transmission schedule generator 109 determines the time interval for transmission by each connection based on the value obtained by dividing the total amount of data stored in the buffer 102 by the data amount determined by the transmission data amount determiner 108 and on the allowed transmission time. Due to this, it is possible to realize highly efficient data transfer with fewer retransmissions.

Moreover, if the data amount determined by the transmission data amount determiner 108 is very small, the transmission schedule generator 109 can generate a transmission schedule to the effect of interruption of data transmission. The communicator 103 can thereby temporarily halt transmitting data. Due to this, it is possible to prevent an increase in a connection fee following an increase in the number of times of using the line in the case, for example, of using a line for which a connection fee is charged according to a frequency of using the line.

Furthermore, the transmission data amount determiner 108 can determine the amount of transmittable data by one connection with reference to the environmental information such as the weather conditions acquired by the environmental information acquirer 106 and stored in the environmental information storer 107. It is thereby possible to grasp the line state without using the line and reduce the opportunity of using the line when the line state is bad. Moreover, it is possible to expect improved accuracy of the data amount determined by the transmission data amount determiner 108 by using both the line state data and the environmental information for the determination.

In the above-described case, the data transfer device 10 may acquire the environmental information by downloading the environmental information from the data collection server 20. Accordingly, if the data transfer system is configured to connect a plurality of data transfer devices 10 to one data collection server 20 via the wide area network N, it suffices to dispose the measurement instruments and/or the like for detecting the weather conditions only in the data collection server 20. This can contribute to reducing cost of the entire system.

Moreover, if the log data that the data acquirer 101 receives from the other devices includes the environmental information, the environmental information acquirer 106 may extract the environmental information from the log data received by the data acquirer 101 and use the environmental information. Accordingly, there is no need to dispose the measurement instruments and/or the like for detecting the weather conditions in any of the data transfer device 10 and the data collection server 20. It is thereby possible to expect further cost reduction.

The present invention is not limited to the above-described embodiment and various changes and modifications can be made of the present invention without departure of the scope and spirit of the present invention.

For example, functions of the respective constituent elements (the line state acquirer 104, the transmission data amount determiner 108, the transmission schedule generator 109, and/or the like) of the data transfer device 10 according to the embodiment may be realized by causing the CPU and/or the like to execute a predetermined program.

INDUSTRIAL APPLICABILITY

The present invention is suitably applicable to a system for acquiring log data including production of electricity at every time of day from devices configuring a solar photovoltaic power generation system and for transferring the log data to a server.

DESCRIPTION OF SYMBOLS

10 Data transfer device
20 Data collection server
101 Data acquirer
102 Buffer
103 Communicator
104 Line state acquirer
105 Line state storer
106 Environmental information acquirer
107 Environmental information storer
108 Transmission data amount determiner
109 Transmission schedule generator

The invention claimed is:
1. A data transfer device comprising:
a data acquirer acquiring data from another device and storing the data in a buffer;
a communicator transmitting the data stored in the buffer to a server connected to the data transfer device via a predetermined network;
a line state acquirer acquiring line state data relating to a state of a line;
a line state storer accumulating and storing the line state data acquired by the line state acquirer;

a transmission data amount determiner determining an amount of transmittable data as the amount of data transmittable by one connection with the server, based on the line state data stored in the line state storer; and a transmission schedule generator generating a transmission schedule for data transmission to the server based on a total amount of data stored in the buffer and the amount of transmittable data, wherein the communicator transmits the data stored in the buffer according to the transmission schedule, when the total amount of the data stored in the buffer is larger than the amount of transmittable data, the transmission schedule generator includes information for enabling the communicator to transmit the data stored in the buffer by dividing the data according to a plurality of connections, in the transmission schedule, and the transmission schedule generator determines a time interval when transmitting by dividing the data according to the plurality of connections based on (i) a value obtained by dividing the total amount of the data stored in the buffer by the amount of transmittable data, and (ii) an allowed transmission time that is determined based on a current time and a time when the data acquirer acquires data next.

2. The data transfer device according to claim 1, further comprising:

an environmental information acquirer acquiring current environmental information; and an environmental information storer storing the environmental information acquired by the environmental information acquirer, wherein the transmission data amount determiner determines the amount of transmittable data based on the environmental information stored in the environmental information storer.

3. The data transfer device according to claim 2, wherein the environmental information is information relating to current weather conditions.

4. The data transfer device according to claim 2, wherein the environmental information acquirer extracts the environmental information from the data acquired by the data acquirer.

5. A data transfer device comprising:

a data acquirer acquiring data from another device and storing the data in a buffer;

a communicator transmitting the data stored in the buffer to a server connected to the data transfer device via a predetermined network;

an environmental information acquirer acquiring current environmental information;

an environmental information storer storing the environmental information acquired by the environmental information acquirer;

a line state acquirer acquiring line state data relating to a state of a line;

a line state storer accumulating and storing the line state data acquired by the line state acquirer;

a transmission data amount determiner determining an amount of transmittable data as the amount of data transmittable by one connection with the server; and a transmission schedule generator generating a transmission schedule for data transmission to the server based on a total amount of data stored in the buffer and the amount of transmittable data, wherein the communicator transmits the data stored in the buffer according to the transmission schedule, and the transmission data amount determiner determines the amount of transmittable data based on the environmental information if the line state data is not stored in the line state storer, and determines the amount of transmittable data based on the line state data if the line state data is stored in the line state storer.

6. The data transfer device according to claim 5, wherein the environmental information is information relating to current weather conditions.

7. A data transfer method comprising:

a data acquisition step of acquiring data from another device and storing the data in a buffer;

a communication step of transmitting the data stored in the buffer to a connected server via a predetermined network;

a line state acquisition step of acquiring line state data relating to a state of a line and storing the line state data in a line state storer;

a transmission data amount determining step of determining an amount of transmittable data as the amount of data transmittable by one connection with the server, based on the line state data stored in the line state storer; and a transmission schedule generating step of generating a transmission schedule for data transmission to the server based on a total amount of data stored in the buffer and the amount of transmittable data, wherein in the communication step, the data stored in the buffer is transmitted according to the transmission schedule, when the total amount of the data stored in the buffer is larger than the amount of transmittable data, in the transmission schedule generating step, information for enabling the communicator to transmit the data stored in the buffer by dividing the data according to a plurality of connections is included in the transmission schedule, and in the transmission schedule generating step, a time interval when transmitting by dividing the data according to the plurality of connections is determined based on (i) a value obtained by dividing the total amount of the data stored in the buffer by the amount of transmittable data, and (ii) an allowed transmission time that is determined based on a current time and a time when the data acquirer acquires data next.

8. A data transfer system comprising:

one or more data transfer devices; and a server connected to the one or more data transfer devices via a predetermined network so as to be mutually communicable, wherein each of the one or more data transfer devices includes:

a data acquirer acquiring data from another device and storing the data in a buffer;

a communicator transmitting the data stored in the buffer to the server;

a line state acquirer acquiring line state data relating to a state of a line;

a line state storer accumulating and storing the line state data acquired by the line state acquirer;

a transmission data amount determiner determining an amount of transmittable data as the amount of data transmittable by one connection with the server, based on the line state data stored in the line state storer; and a transmission schedule generator generating a transmission schedule for data transmission to the server based on a total amount of data stored in the buffer and the amount of transmittable data, and wherein the communicator transmits the data stored in the buffer according to the transmission schedule, when the total amount of the data stored in the buffer is larger than the amount of transmittable data, the transmission schedule generator includes information for enabling the communicator to transmit the data stored in the buffer by dividing the data according to a plurality of connections, in the transmission schedule, and the transmission schedule generator determines a time interval when transmitting by dividing the data according to the plurality of connections based on (i) a value obtained by dividing the total amount of the data stored in the buffer by the amount of transmittable data, and (ii) an allowed transmission time that is determined based on a current time and a time when the data acquirer acquires data next.

9. The data transfer system according to claim 8, wherein each of the one or more data transfer devices further includes:

an environmental information acquirer acquiring current environmental information; and an environmental information storer storing the environmental information acquired by the environmental information acquirer, and wherein the transmission data amount determiner determines the amount of transmittable data based on the environmental information stored in the environmental information storer.

10. The data transfer system according to claim 9, wherein the server transmits data including the environmental information to the one or more data transfer devices, and the environmental information acquirer acquires the data transmitted from the server via the communicator and extracts the environmental information from the acquired data.

11. The data transfer device according to claim 1, wherein the line state data includes transmission success/failure of a past connection and at least one of a connect time and a number of bytes actually transmitted of the past connection, and the transmission data amount determiner determines the amount of transmittable data based on the line state data for a past predetermined duration.

12. The data transfer method according to claim 7, wherein the line state data includes transmission success/failure of a past connection and at least one of a connect time and a number of bytes actually transmitted of the past connection, and in the transmission data amount determining step, the amount of transmittable data is determined based on the line state data for a past predetermined duration.

13. The data transfer system according to claim 8, wherein the line state data includes transmission success/failure of a past connection and at least one of a connect time and a number of bytes actually transmitted of the past connection, and the transmission data amount determiner determines the amount of transmittable data based on the line state data for a past predetermined duration.

\* \* \* \* \*